Patented June 29, 1937

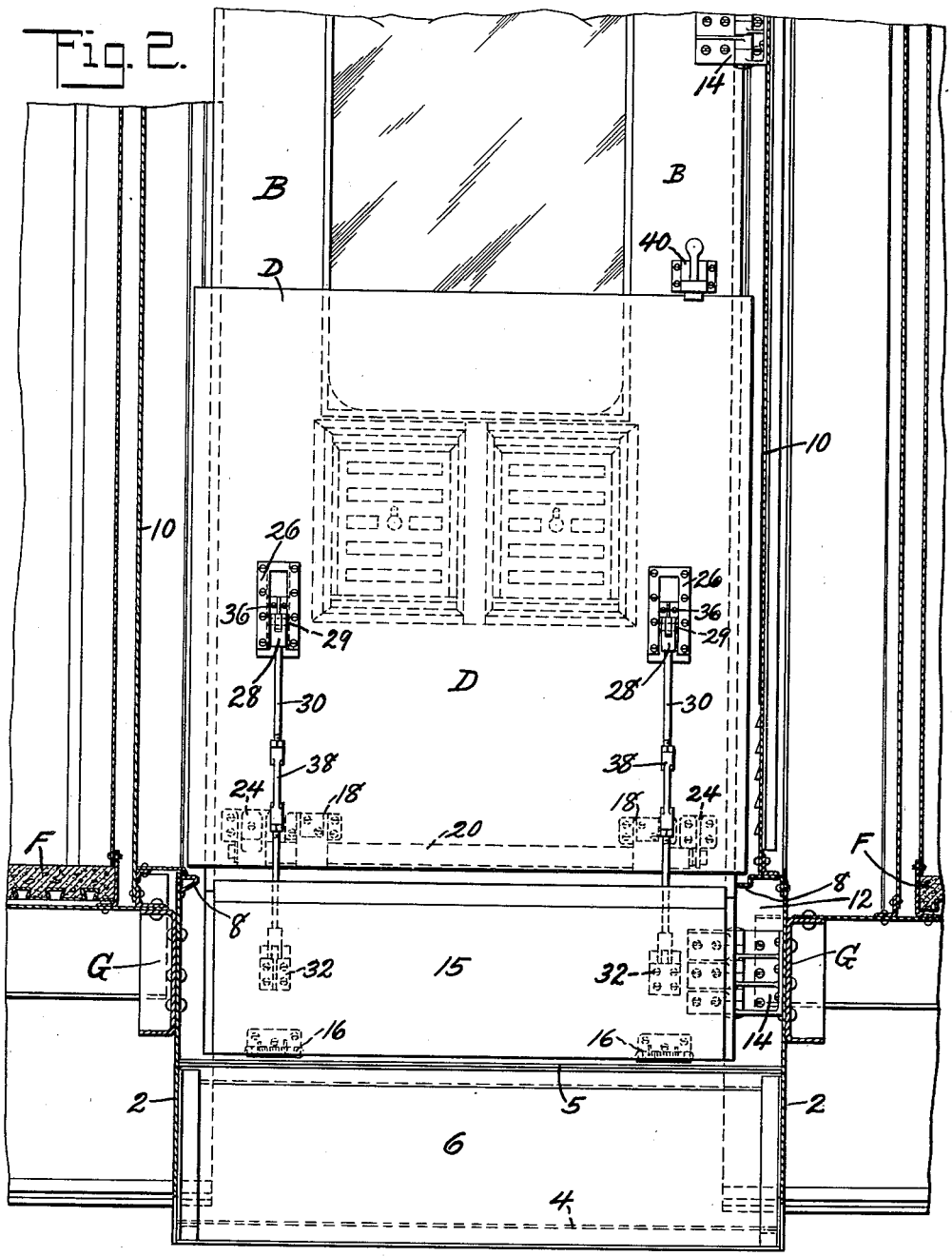

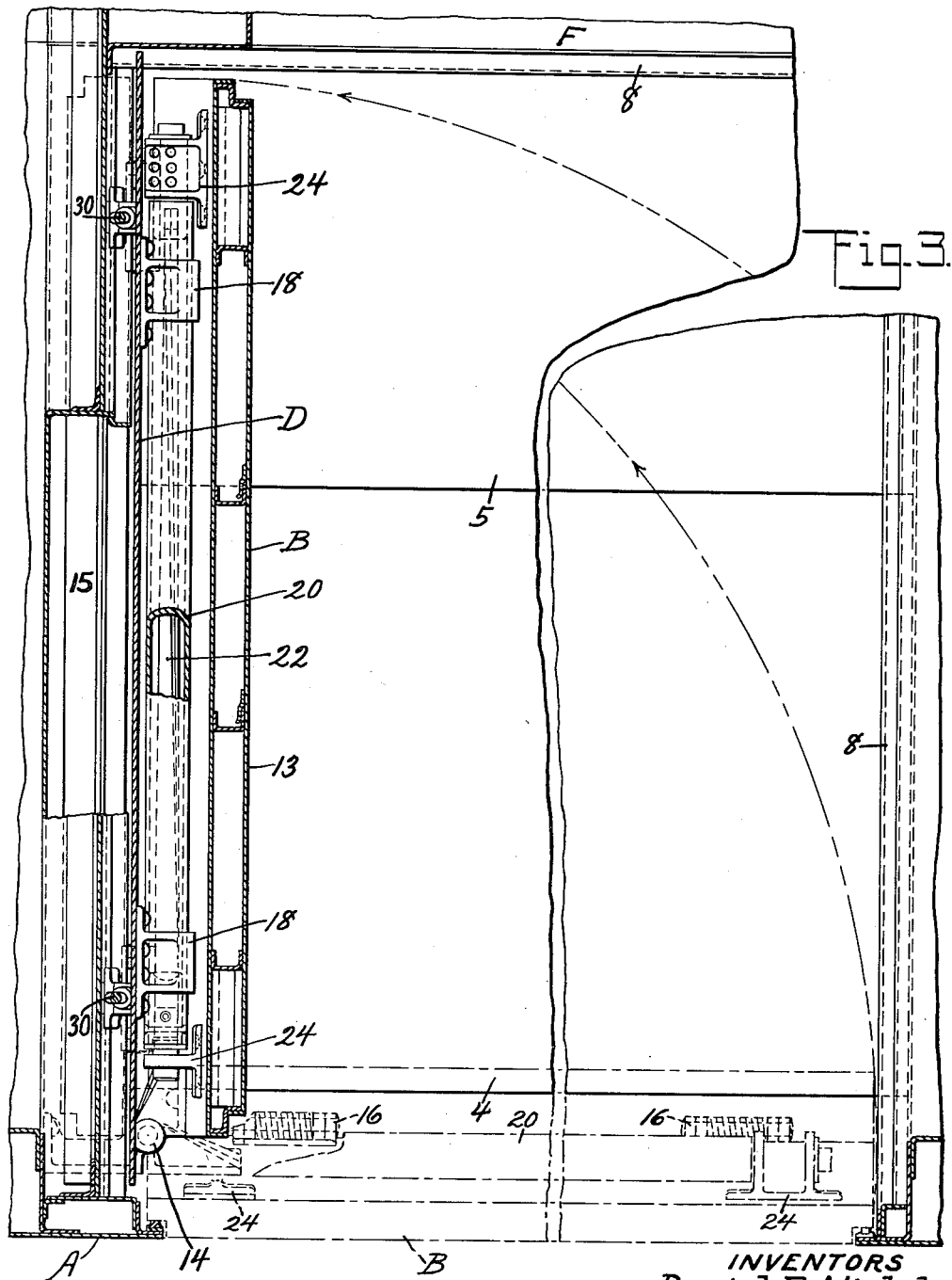

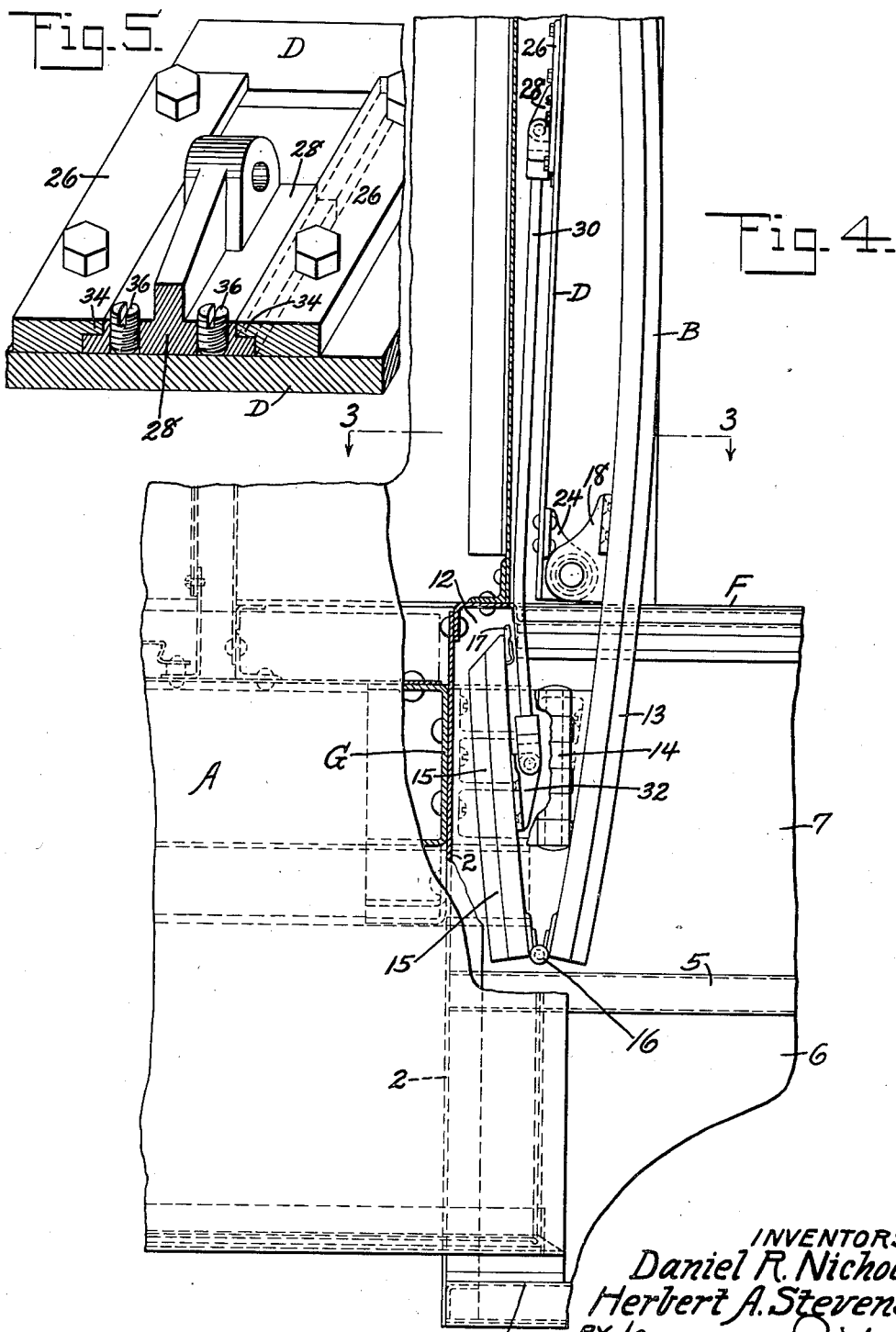

2,085,443

UNITED STATES PATENT OFFICE 2,085,443

CAR SIDE DOOR AND TRAP DOOR

Daniel R. Nichols and Herbert A. Stevens, Berwick, Pa., assignors to American Car and Foundry Company, New York, N. Y., a corporation of New Jersey Application January 17, 1936, Serial No. 59,512

10 Claims. (Cl. 105—450)

This invention deals with side doors and trap doors in general and in particular with coupled side doors and trap doors for streamlined railway vehicles.

Previous railway vehicle construction has made no provision for covering the space between the fixed steps and the lowered trap door, that is the space below the side door. This open space detracts very materially from the appearance of a car as well as offering considerable air resistance. It is an object, therefore, of this invention to provide a side door for cars which conforms to the car outline and completely covers the step well.

A further object of the invention is the provision of a car side door having a portion thereof movable relative to the main body of the door in order that the door will clear the car steps.

A still further object of the invention is the provision of a car side door having a lower movable portion and a trap door connected thereto for simultaneous movement.

These and other objects of the invention will be apparent to those skilled in the art from a study of the following description and accompanying drawings in which:

Fig. 2 is a sectional view taken substantially on line 2—2 of Fig. 1 but showing the trap door in the raised position;

Fig. 3 is a sectional view taken on line 3—3 of Fig. 4 but showing the door in the closed position by dot and dash lines;

Fig. 4 is a side view of the car with parts broken away and showing the door in the open position, and Fig. 5 is an enlarged perspective view of the adjusting means.

Figure 1:
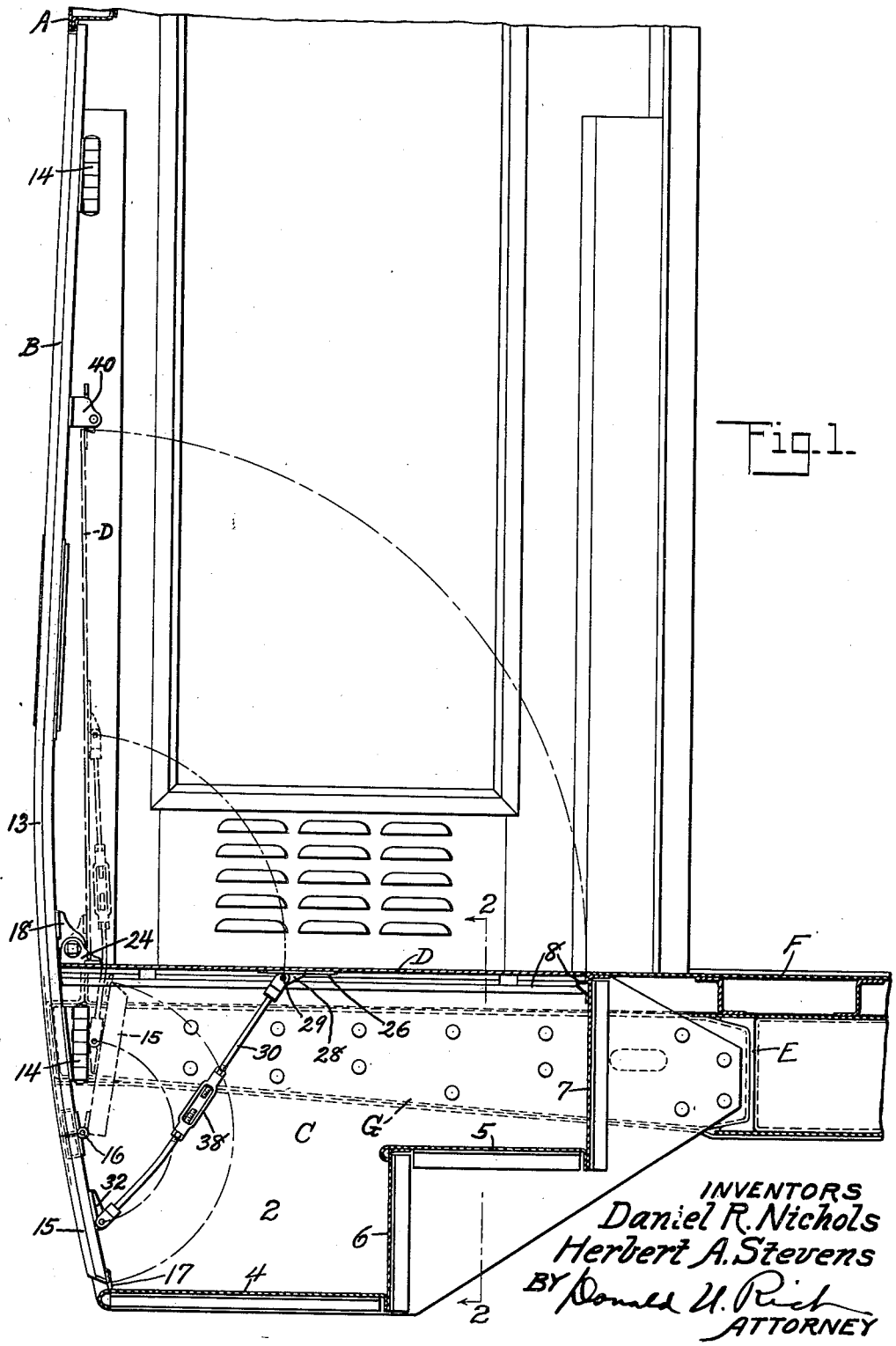
Figure 1 is an end view partly in section showing the side door and trap door in the closed or traveling position.

Referring now to the drawings in detail, it is seen that the car has side walls A formed with a door opening adapted to be closed by a door B and that fixed steps are connected to the car frame forming a step well C which is covered by trap door D. The car is built with the usual center sill E, floor F and cross-bearers G to which are attached plates 2 connected together by step treads 4 and 5, and risers 6 and 7 forming the step well. The riser 7 and the plates forming the sides of the step well are provided with ledge portions 8 upon which the trap door may be supported when in the lowered position.

The step well side plates may be separate members, or extensions of the walls 10 forming the passageway, but in any case the passageway wall adjacent the door hinges is set outward from the well side plates in order to provide a pocket 12 as clearly shown in Figs. 2 and 4.

The car door, which conforms to the car contour and when closed is substantially flush with the car side, is formed in two parts, the upper or main part 13 of which is carried by hinges 14 fastened to the passageway wall and the lower or auxiliary part 15 of which is hingedly carried by the upper part through spring hinges 16. The joint between the two door parts may be sealed by weatherstripping, while the joint between the lower or auxiliary door part and step tread 4 is sealed by rubber strip 17 securely attached to the flap.

Brackets 18 are attached to the inner face of the door and carry a tube 20 housing a torsion spring 22 and providing bearings for brackets 24 attached to the trap door. The torsion spring may be adjusted so as to counterbalance any desired portion of the door weight as is now customary in car construction. Slide plates 26 are attached to the underside of the trap door and carry slide 28 to which is pivotally connected by a pin 29 the rod 30, the other end of which is pivotally connected to bracket 32 attached to the lower or auxiliary door part. The slide is retained in the slide plate by overhanging portion 34 and is provided with set screws 36 by means of which the slide may be fixed to the slide plate. The set screws are provided in order that the proper position of the pivot 29 may be secured to take care of slight errors in construction and insure the proper opening and closing of the auxiliary door. It is quite evident that with the bracket 32 fixed in position there can be but one point at which the pivot 29 may be placed which will give the proper closing and opening of the auxiliary door and that this point will vary slightly for each assembly. Due to the possible change in position of the pivot pin 29 it is necessary that the length of the rod 30 be adjustable and this is accomplished by use of a turnbuckle 38 although any other suitable means may be used.

The operation of the doors is as follows: Assuming the parts in the position as shown by full lines in Fig. 1, the catch (not shown) holding the trap door down is released, allowing the torsion spring to lift the door slightly permitting the operator to grasp the trap door and elevate it to its inoperative position in which it rests against the inner side of the main door part and is retained by catch 40. During raising of the trap door the properly positioned and adjusted link 30 has lifted the auxiliary door to the dash and dot line position shown in Fig. 1 or by Fig. 2, after which the main door is unlatched and swung back on its hinges carrying the entire assembly back against the passageway wall with the auxiliary door fitting into the pocket 12 with all parts concealed by the main door. The hinges 16 are, of course, so positioned as to permit the folded assembly to clear the step tread 5 during opening of the main door.

The slide plate has been described as fastened to the trap door, but this may be attached to the auxiliary door instead and accomplish the same results, also the auxiliary door has been shown when folded as clearing a single step riser, but it is obvious that where conditions necessitate it could be designed to fold up sufficiently to clear two or more risers. The above and other changes and rearrangements of parts will be obvious to one skilled in the art and such changes are contemplated as fall within the scope of the following claims.

What is claimed is:

1. A side door assembly for railway car passageways having a step well and steps therein in the path of the door and comprising, a main door hinged to the car structure adjacent the passageway wall, an auxiliary door hinged to the lower part of the main door, a trap door covering said step well, and means connecting said trap door and auxiliary door for movement in unison, said trap door and auxiliary door being capable of upward swinging movement to a position permitting swinging of the side door assembly.

2. A side door assembly for railway car passageways having a step well and steps therein in the path of the door and comprising, a main door hinged to the car structure adjacent the passageway wall, an auxiliary door hinged to the lower part of the main door for upward movement, a trap door covering said step well and hinged to said main door for upward movement, means connecting said trap door and auxiliary door for movement in unison, and means retaining said trap door in raised position permitting swinging of said assembly inward toward the passageway wall.

3. A side door assembly for railway car passageways having a step well and comprising, a main door hinged to the car structure, an auxiliary door hinged to the main door for movement relative thereto, a trap door covering said step well, and means connecting said trap door and auxiliary door for movement substantially in unison, said means being adjustable to insure proper operation of said auxiliary and trap doors.

4. A side door assembly for railway car passageways having a step well and comprising, a main door hinged to the car structure, an auxiliary door hinged to the main door for movement relative thereto, a trap door covering said step well, and means connecting said trap door and auxiliary door for movement substantially in unison, said means being adjustable both as to length and position to insure proper operation of said auxiliary trap door.

5. A side door assembly for railway car passageways having a step well and comprising, a main door hinged to the car structure, an auxiliary door hinged to the main door for movement relative thereto, a trap door covering said step well, and means connecting said trap door and auxiliary door for movement substantially in unison, said means comprising slide means connected to one of said last named doors and link means connecting said slide means and the other of said last named doors.

6. A side door assembly for railway car passageways having a step well and comprising, a main door hinged to the car structure, an auxiliary door hinged to the main door for movement relative thereto, a trap door covering said step well, slide means connected to said trap door, and variable length means connecting said slide means and auxiliary door.

7. A side door assembly for railway car passageways having a step well and comprising, a main door hinged to the car structure, an auxiliary door hinged to the main door for movement relative thereto, a trap door covering said step well, slide means connected to the said trap door, variable length means connecting said slide means and auxiliary door, and means associated with said slide means to prevent sliding movement thereof.

8. As an article of manufacture a car side door assembly comprising, a main door, an auxiliary door hinged to said main door for relative movement, a trap door hinged to said main door for movement relative thereto and means connecting said auxiliary door and trap door for movement substantially in unison.

9. As an article of manufacture, a car side door assembly comprising a two-part door including a main door portion and an auxiliary door portion hinged to said main portion for movement relative to said main portion, and an additional door hingedly connected to the main door portion and normally lying in a plane substantially at right angles to said main door portion.

10. As an article of manufacture, a car side door assembly comprising a two-part door having a main portion and an auxiliary portion hinged to said main portion adjacent the lower end of the latter, an additional door hingedly connected to the main door portion on an axis substantially at right angles to the hinge axis of the main door portion, and means connecting said auxiliary portion and additional door of such a character as to effect simultaneous movement of both thereof.

DANIEL R. NICHOLS.
HERBERT A. STEVENS.